United States Patent
Synnestvedt

(10) Patent No.: US 7,529,249 B1
(45) Date of Patent: May 5, 2009

(54) VOICE AND DIAL SERVICE LEVEL AGREEMENT ENFORCEMENT ON UNIVERSAL GATEWAY

(75) Inventor: Robert Glenn Synnestvedt, Palo Alto, CA (US)

(73) Assignee: Cisco Technology, Inc, San Jose, CA (US)

( * ) Notice: Subject to any disclaimer, the term of this patent is extended or adjusted under 35 U.S.C. 154(b) by 1505 days.

(21) Appl. No.: 10/104,816

(22) Filed: Mar. 22, 2002

(51) Int. Cl.
H04L 12/28 (2006.01)

(52) U.S. Cl. .................. 370/395.21; 370/252

(58) Field of Classification Search .......... 370/351, 370/352, 353, 354, 356, 386, 392, 401, 402, 370/419, 437
See application file for complete search history.

(56) References Cited

U.S. PATENT DOCUMENTS

| | | | |
|---|---|---|---|
| 4,694,487 A | 9/1987 | Chang et al. | |
| 6,070,192 A * | 5/2000 | Holt et al. | 709/227 |
| 6,108,306 A | 8/2000 | Kalkunte et al. | |
| 6,151,688 A | 11/2000 | Wipfel et al. | |
| 6,185,288 B1 * | 2/2001 | Wong | 379/219 |
| 6,262,984 B1 | 7/2001 | Rochberger | |
| 6,279,054 B1 | 8/2001 | Boyle | |
| 6,324,264 B1 | 11/2001 | Wiener et al. | |
| 6,363,065 B1 * | 3/2002 | Thornton et al. | 370/352 |
| 6,370,151 B1 | 4/2002 | Bojanic | |
| 6,411,601 B1 * | 6/2002 | Shaffer et al. | 370/230 |
| 6,490,273 B1 | 12/2002 | DeNap et al. | |
| 6,490,344 B1 | 12/2002 | Murai et al. | |
| 6,513,060 B1 | 1/2003 | Nixon et al. | |
| 6,523,068 B1 * | 2/2003 | Beser et al. | 709/238 |
| 6,556,659 B1 * | 4/2003 | Bowman-Amuah | 379/9.04 |
| 6,584,093 B1 * | 6/2003 | Salama et al. | 370/351 |
| 6,584,529 B1 | 6/2003 | Thomas | |
| 6,625,645 B1 | 9/2003 | Van Horne et al. | |
| 6,625,651 B1 | 9/2003 | Swartz et al. | |
| 6,629,149 B1 | 9/2003 | Fraser et al. | |
| 6,654,366 B1 * | 11/2003 | Ketcham | 370/352 |
| 6,665,714 B1 | 12/2003 | Blumenau et al. | |
| 6,704,309 B1 * | 3/2004 | Nada et al. | 370/389 |
| 6,714,515 B1 | 3/2004 | Marchand | |
| 6,765,903 B1 | 7/2004 | Allen et al. | |
| 6,798,771 B1 * | 9/2004 | Low et al. | 370/353 |
| 6,798,786 B1 * | 9/2004 | Lo et al. | 370/468 |
| 6,856,676 B1 * | 2/2005 | Pirot et al. | 379/201.01 |
| 6,862,626 B1 | 3/2005 | Ryu | |
| 6,883,033 B2 | 4/2005 | Maruyama et al. | |
| 6,909,711 B1 * | 6/2005 | Noguchi | 370/356 |

(Continued)

OTHER PUBLICATIONS

Khalil et al., Implementation of a Bandwidth Broker for Dynamic End-to-End Resource Reservation in Outsourced Virtual Private Network, Local Computer Networks, 2000, LCN 2000, Proceedings, 25th Annual IEEE Conference, Nov. 8-10, 2000, pp. 511-519.

*Primary Examiner*—Phirin Sam
(74) *Attorney, Agent, or Firm*—Marger, Johnson & McCollom

(57) ABSTRACT

A network device and method of operation. The network device receives a call setup request, identifies the appropriate resource server for that call and transmits it to a resource server that then authorizes or does not authorize the call associated with the setup request. The authorization process allows enforcement of voice and dial agreements by authorizing those calls within a particular agreement and denying call setup requests for those that violate the agreements.

21 Claims, 2 Drawing Sheets

U.S. PATENT DOCUMENTS

| | | | |
|---|---|---|---|
| 6,944,150 B1 * | 9/2005 | McConnell et al. | 370/352 |
| 6,961,857 B1 * | 11/2005 | Floryanzia | 713/168 |
| 6,980,515 B1 * | 12/2005 | Schunk et al. | 370/230.1 |
| 6,983,319 B1 | 1/2006 | Lu et al. | |
| 7,002,919 B1 * | 2/2006 | El-Sayed | 370/252 |
| 7,075,922 B2 * | 7/2006 | Mussman et al. | 370/352 |
| 7,173,910 B2 * | 2/2007 | Goodman | 370/252 |
| 7,185,094 B2 * | 2/2007 | Marquette et al. | 709/225 |
| 7,209,473 B1 * | 4/2007 | Mohaban et al. | 370/352 |
| 2001/0047333 A1 * | 11/2001 | Kim et al. | 705/40 |
| 2002/0075844 A1 | 6/2002 | Hagen | |
| 2002/0078119 A1 | 6/2002 | Brenner et al. | |
| 2002/0085569 A1 * | 7/2002 | Inoue | 370/401 |
| 2002/0089985 A1 | 7/2002 | Wahl | |
| 2002/0091854 A1 | 7/2002 | Smith | |
| 2002/0102999 A1 | 8/2002 | Maggenti et al. | |
| 2002/0103895 A1 | 8/2002 | Chiang | |
| 2002/0107952 A1 | 8/2002 | Mancusi et al. | |
| 2002/0122417 A1 * | 9/2002 | Miller et al. | 370/352 |
| 2002/0143939 A1 * | 10/2002 | Riddle et al. | 709/224 |
| 2002/0160811 A1 | 10/2002 | Jannette et al. | |
| 2003/0002476 A1 * | 1/2003 | Chung et al. | 370/352 |
| 2003/0051195 A1 | 3/2003 | Bosa et al. | |
| 2003/0065741 A1 | 4/2003 | Vo | |
| 2003/0074576 A1 | 4/2003 | Kelly | |
| 2004/0030752 A1 | 2/2004 | Selgas et al. | |
| 2004/0213223 A1 * | 10/2004 | Mori et al. | 370/389 |
| 2007/0127449 A1 * | 6/2007 | Nix et al. | 370/356 |

\* cited by examiner

VOICE AND DIAL SERVICE LEVEL AGREEMENT ENFORCEMENT ON UNIVERSAL GATEWAY

CROSS REFERENCE TO RELATED APPLICATIONS

This application is being filed with the related, co-pending applications as set forth below:

U.S. patent application Ser. No. 10/104,817 entitled "RESOURCE AND AAA SERVICE DEVICE" filed on Mar. 22, 2002

U.S. patent application Ser. No. 10/104,819, entitled "SEGREGATING SERVICE LEVEL AGREEMENTS ACROSS LARGE-SCALE NETWORKS" filed on Mar. 22, 2002

U.S. patent application Ser. No. 10/104,820, entitled "EXPEDITING PORT RELEASE IN DISTRIBUTED NETWORKS" filed on Mar. 22, 2002

U.S. patent application Ser. No. 10/104,299, entitled "SHARING GATEWAY RESOURCES ACROSS MULTI-POP NETWORKS" filed on Mar. 22, 2002, now U.S. Pat. No. 7,237,026.

BACKGROUND

1. Field

This disclosure relates to network devices on networks that carry both voice and data traffic, more particularly to network devices that manage incoming call requests.

2. Background

Many enterprises have discovered that they can use excess capacity in their data networks to carry voice traffic. Voice over data networks, whether that data network is an Internet Protocol (IP) network, a Frame Relay (FR) network, or an Asynchronous Transfer Mode (ATM) network, is often referred to as Voice over IP (VoIP). For purposes of discussion here, VoIP will be used, even if it refers to other types of data networks.

Typically, a voice signal is encoded and packetized by specialized by end equipment and then routed through a network device across the data network to the call destination, where it is converted back to speech. The packets of voice data will be referred to as voice traffic to differentiate it from data traffic, even though both types of traffic are packetized and transmitted as data. As mentioned previously, the packets may be IP packets, ATM cells or FR frames, among other types of discrete bundles of data.

When data networks are used for a mix of data and voice, many problems may arise. This is especially true in the administration realm, for accounting, authorization and service level agreement (SLA) enforcement. For example, a particular customer may have authorization for 65,000 calls on a given wholesale network. Current implementations typically only track incoming dial calls. If there is a resource management system in place, typically only the incoming dial calls are posted to the resource management system. In this situation, ports that should be retained for dial calls, to meet dial SLAs, may be inadvertently consumed by voice calls. The voice calls may be VoIP calls traveling through a voice gateway, or even calls received through a Public Switched Telephone Network (PSTN), which typically enter the data network through a call gateway. PSTN calls are what may otherwise be referred to as 'standard' or 'traditional' phone calls.

Therefore, it would be useful to have an apparatus and method to track and, if desired, post voice calls prior to their completion to ensure that dial SLA commitments can be met.

SUMMARY

One embodiment is a network device with a port through which it may receive call setup requests. A processor then associates the call setup request with an appropriate resource server and transmits the call setup request to the appropriate server through an output port. The network device may then control the connection or denial of calls to stay within the parameters of a particular service level agreement. A call setup request may be determined by lower level signaling, allowing the call setup request to be identified and processed prior to a network device accepting the call.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
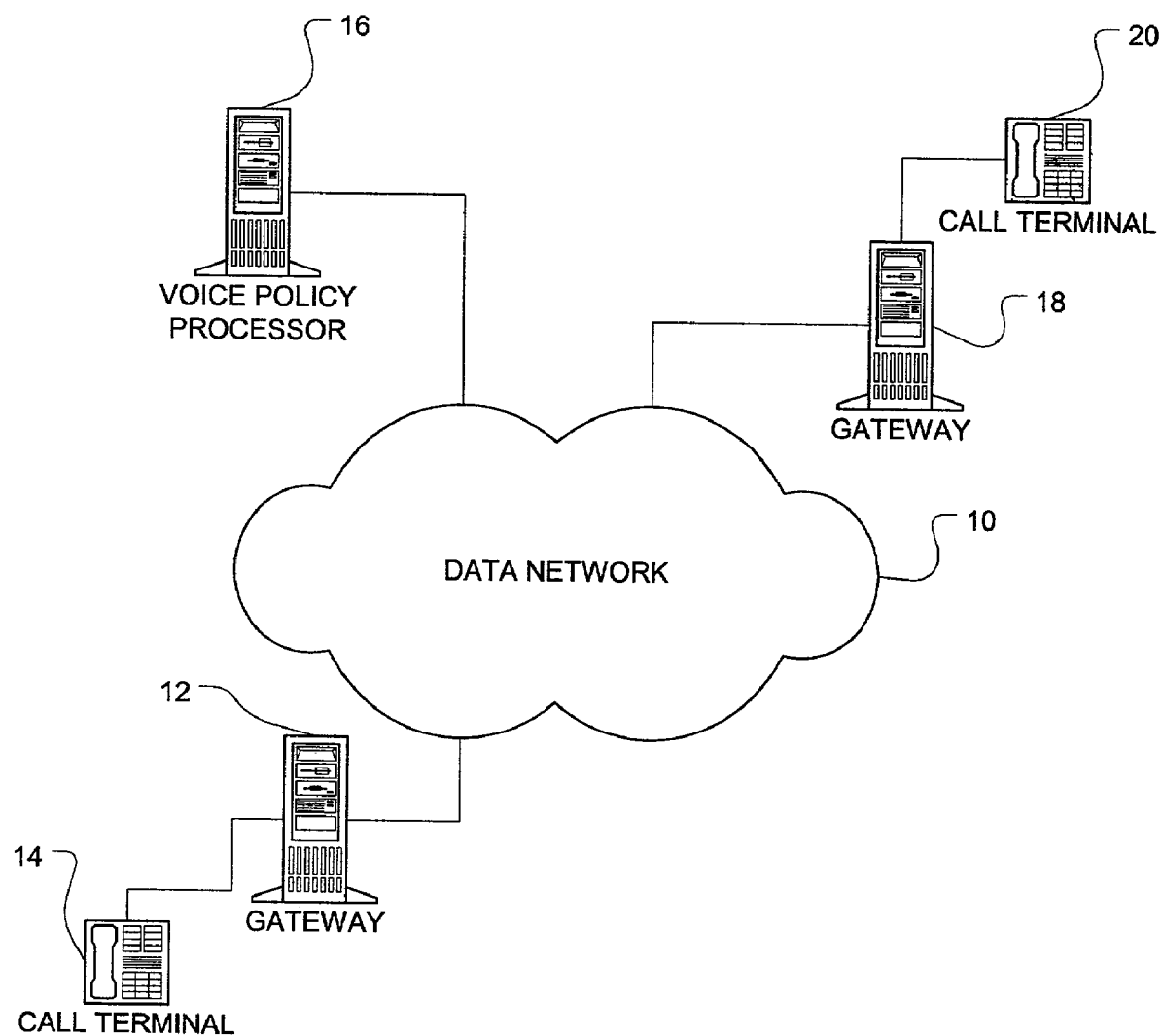
FIG. 1 shows an embodiment of a data network that handles both voice and data calls, in accordance with the invention.

FIG. 1 shows a data network that may be used for transmission of both voice and data traffic. Typically, there will be many more terminals on the network, possibly even thousands more. However, for ease of discussion, only two call terminals are shown. Similarly, the phone terminals are shown as being 'traditional' desktop phones with a handset and base. In many situations, the call terminal may actually be a computer equipped with a speaker and a microphone upon which runs the necessary software to allow the computer to act as a telephone.

In one embodiment of the invention, a user places a call from a call terminal 14 that enters the gateway 12 for transmission across the data network 10. In a typical interaction, a call setup request will be sent to the receiving terminal prior to the actual connection of the call. This may be accomplished under one of many different protocols, including Q.931, H.225/H.323, or SIP (session initiation protocols). Both Q.931 and H.225 are the names of recommendations made by the International Telecommunications Union (ITU), a standards organization that has set out standardized methods of connecting calls to which telecommunications equipment may comply. The standard Q.931 is for ISDN (integrated services digital network) call setup requests. H.225 is the call setup standard for multi-media data networks, which are governed under H.323. The session initiation protocol is used for voice calls over IP networks.

In each of these standards, as well as many others, a call is not actually connected until the call setup request is processed. For example, the call setup request is sent from the sending gateway 12 across the data network 10 to the receiving gateway 18. The receiving gateway 18 then processes the call setup request to determine if the call can be accepted. If the call can be accepted, the receiving gateway 18 sends an affirmative response of some sort back to the calling gateway 12 and the call is connected.

As mentioned previously, current implementations do not track voice over data network calls. This may result in inaccurate monitoring of the number of ports available for a particular customer, resulting in too few ports being left available to that customer. This prevents the wholesaler from being able to meet its service level agreement for that customer. Generally, current systems may use a resource server of some type that tracks incoming calls. However, only dial calls are being tracked. Tracking may take the form of 'posting' the dial calls, where information about a dial call is sent to the resource server responsible for a particular customer's SLA (service level agreement). The resource processor then determines whether the call can or cannot be granted and still allow the SLA to be met.

The resource processor in current implementations will probably be a Remote Authentication Dial-In User Service server (RADIUS), but may be other types of resource servers. For example, Cisco provides Resource Pool Management Server (RPMS) software that may run on a RADIUS server, or on another server. These resource management servers will be referred to as resource servers or policy processors. Policy processors may include RADIUS servers that process the authentication request and subsequent accounting packets. It may also include any server or other device that enforces dial and voice SLAs before normal accounting procedures, such as those used by AAA (authentication, authorization and accounting) servers, typically begin.

In the example of FIG. 1, the receiving gateway 18 receives the call setup request and then routes it to the appropriate resource server for that call. The appropriate resource server or policy processor may be determined by identifying the incoming call from its point-of-presence (POP) associated with a particular customer, or other attributes. The policy processor 16 then determines if the call can be granted within the parameters of the SLA.

In order to process the call setup request prior to a gateway accepting the call, the call setup request must be identified as soon as is possible by the receiving station. The protocols mentioned earlier, such a Q.931, H.225 and SIP, are sometimes referred to as Level 3 protocols. The level refers to the OSI (open system interconnect) reference model, in which level 3 is the network layer, providing switching functions.

In the OSI reference model, there are traditionally 7 layers, although many equipment manufacturers may combine various levels together. Layer 1 is the physical layer, governing the actual hardware connections. Layer 2 is the data link layer, in which voltage signals are converted to bits and bits formed into data groups. Layer 3 is the network layer, as mentioned above. Layer 4 governs the transport mechanisms and layer 5 governs the session parameters of a communications session. Layer 6 governs the presentation of the data and layer 7 provides standardization of the interaction between applications.

Although the protocols discussed above are layer 3 protocols, there are unique signals sent by each in layers 1 and 2. The hardware of the receiving gateway can be programmed to recognize the voltage levels and fluctuations associated with a call setup request. Once reception of a call setup request is determined in layers 1 and 2, the network device at the receiving station can route the call setup request to the appropriate policy server. This lower-level signaling allows the call setup request to be processed quickly to authenticate the call setup request. In some cases, this may be referred to as First Authenticate Service Type (FAST).

One advantage of this type of pre-processing of call setup requests lies in resource preservation. In the gateway or other network device that receives the call setup request, the processor is a limited resource. By judiciously processing the identified call request, the processing resources may be preserved by not committing the processor to a connected call. If the call is authorized under the various SLAs, then the processor is committed to the call. However, if the call is not authorized, the processor is not then committed to a call unnecessarily.

Figure 2:
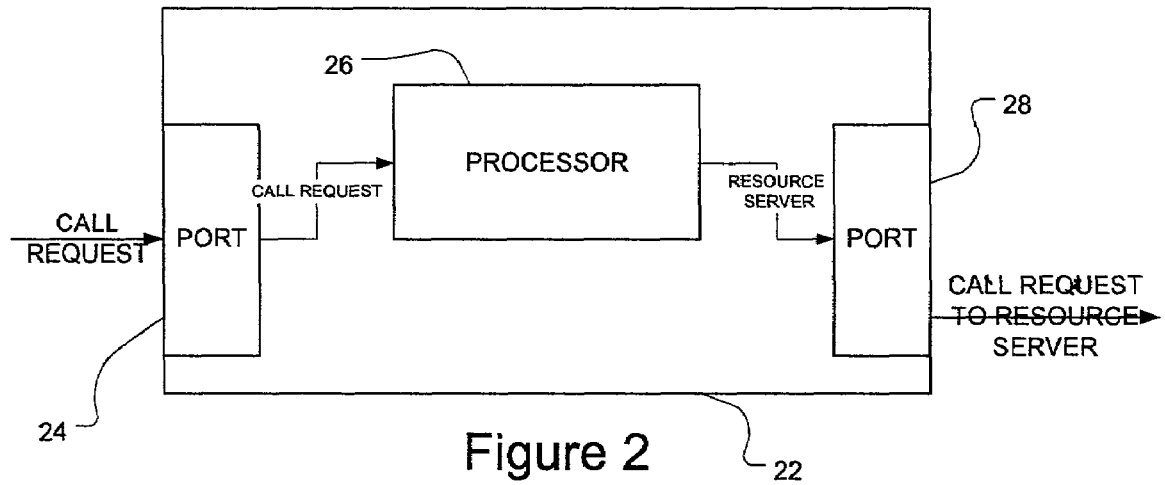
FIG. 2 shows an embodiment of a network device operable to provide set up requests for voice calls, in accordance with the invention.

One example of a network device having a processor for routing authorization information in accordance with the invention is shown in FIG. 2. The network device 22 includes an input port 24 through which the call setup request is received. As noted above, the call setup request may result from voltages and fluctuations of voltages at the physical or data link layers, rather than the standardized call setup request at the network layer.

The call setup request is then received at the processor, which in turn identifies the appropriate resource server to which that call setup request must be sent for authorization. The call setup request is then transmitted through the output port 28 to the appropriate resource server. The network device has been referred to as a gateway, but in a more general sense than an actual voice gateway. Gateway as used here may be any network device that receives and processes voice calls, including servers, routers and other types of network devices than a universal gateway. The FAST process may be embodied in machine-readable code that, when executed, causes the network device to perform these functions.

Similarly, the processor may be any type of processor, such as a general-purpose processor, a digital signal processor (DSP), or a microcontroller, as examples. The processor may be any device that is capable of identifying a call setup request and determining to which resource server that request needs to be directed. Further, the input and output ports may be the same port, and are shown as separate ports for ease of understanding. The network device may use any means to perform the tasks of the invention.

Figure 3:
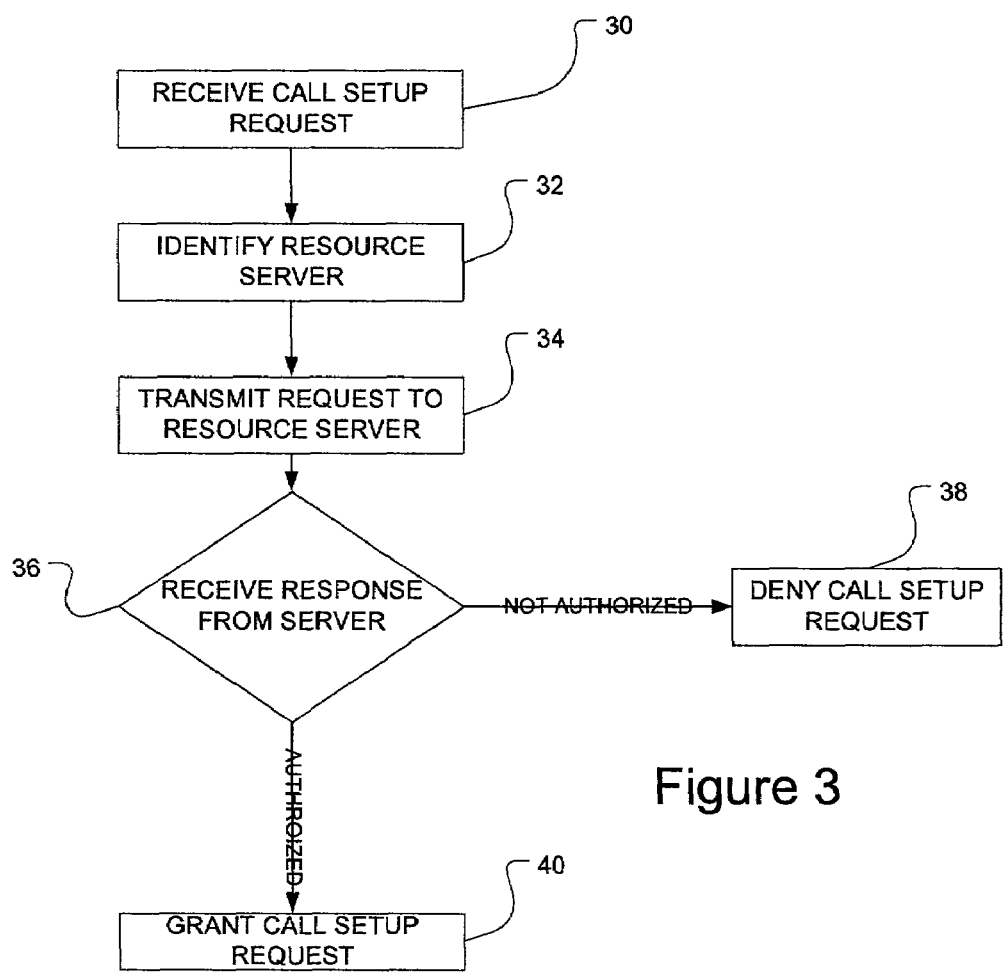
FIG. 3 shows a flowchart of one embodiment of a method to pre-authorize voice calls

A flowchart of one embodiment of the method of the invention is shown in FIG. 3. The call setup request is received at 30. The resource server necessary to authorize the call setup request is identified at 32, typically by the processor discussed above. The request is transmitted to the resource server at 34. Optionally, the method may include the processes of receiving the response from the server at 36 and the resulting resolutions at 38 and 40. For example, if the response from the server indicates that the call associated with the call setup request would violate the dial or voice SLA, the call is not authorized and the call setup request would be denied at 38. If, however, the call would not violate those agreements, the call setup request would be granted at 40. However, as mentioned, these further processes in the method are optionally included as part of this embodiment of invention.

In this manner, a call setup request can be granted or denied prior to the gateway device accepting the call. As mentioned previously, the identification of the signals at the lower layers allows the pre-authorization process to occur with enough time to avoid committing the processor of the network device to a call that violates any SLAs. As also mentioned previously, current implementations typically only track the port usage and accounting for dial calls, not for dial and voice calls, even though voice calls may consume ports needed to meet dial SLAs.

Thus, although there has been described to this point a particular embodiment for a method and apparatus for voice and dial SLA enforcement, it is not intended that such specific references be considered as limitations upon the scope of this invention except in-so-far as set forth in the following claims.

What is claimed is:

1. A network device, comprising:
   an input port operable to detect layer 1 and 2 signals associated with a voice over data network call setup request, wherein the layer 1 and 2 signals comprise voltage levels and voltage fluctuations associated with a call setup request;
   a processor configured to:
      identify a customer associated with the call setup request, wherein the customer comprises a plurality of users;
      determine an appropriate resource server to authorize the call setup request based upon the customer, wherein the resource server is responsible for a service level agreement associated with the customer; and
      associate the appropriate resource server with the call setup request; and
   an output port through which the processor transmits the voice over data network call setup request to the resource server.

2. The network device of claim 1, wherein the network device further comprises a universal gateway.

3. The network device of claim 1, wherein the network device further comprises a router.

4. The network device of claim 1, wherein the call request further comprises a call setup request under Q.931.

5. The network device of claim 1, wherein the call request further comprises a call setup request under H.225.

6. The network device of claim 1, wherein the call request further comprises a call setup request under session initiation protocol.

7. The network device of claim 1, wherein the resource server further comprises a remote authentication dial-in user service server.

8. A method of pre-authorizing a call, the method comprising:
   detecting layer 1 and 2 signals received at input hardware of a network device, wherein the layer 1 and 2 signals are detected by recognizing voltage levels and voltage fluctuations associated with a call setup request;
   determining that the layer 1 and 2 signals are associated with a voice over data networks call setup request;
   determining an appropriate resource server to authorize the call setup request based upon a customer associated with the call setup request, wherein the resource server is responsible for a service level agreement associated with the customer, and wherein the customer comprises a plurality of users;
   associating the resource server with the call setup request; and
   transmitting the call setup request to the resource server.

9. The method of claim 8, wherein the method further comprises receiving a response from the resource server indicating that the call is not within service level agreements for the customer and denying the call setup request, wherein the service level agreements comprise a number of active calls on a network.

10. The method of claim 8, wherein the method further comprises receiving a response from the resource server indicating that the call is within service level agreements for the customer and granting the call setup request.

11. The method of claim 8, wherein determining that the layer 1 and 2 signals are associated with a voice over data networks call setup request further comprises identifying layer 1 and 2 signals associated with a Q.931 call setup request.

12. The method of claim 8, wherein determining that the layer 1 and 2 signals are associated with a voice over data networks call setup request further comprises identifying layer 1 and 2 signals associated with a H.225 call setup request.

13. The method of claim 8, wherein determining that the layer 1 and 2 signals are associated with a voice over data networks call setup request further comprises identifying layer 1 and 2 signals associated with a session initiation protocol call setup request.

14. The method of claim 8, wherein determining an appropriate resource server further comprises identifying a remote authentication dial-in user service server.

15. A network device, comprising:
   a means for detecting layer 1 and 2 signals associated with a voice over data network call setup request, wherein the means for detecting layer 1 and 2 signals comprises means for recognizing voltage levels and voltage fluctuations associated with the call setup request;
   a means for identifying a customer associated with the call setup request, wherein the customer comprises a plurality of users;
   a means for determining an appropriate resource server to authorize the call based upon the customer;
   a means for associating an appropriate resource server with the call setup request; and
   a means for transmitting the voice over data network call setup request to the resource server.

16. The network device of claim 15, wherein the network device further comprises a universal gateway.

17. The network device of claim 15, wherein the network device further comprises a router.

18. The network device of claim 15, wherein the resource server further comprises a remote authentication dial-in user service server.

19. An article of machine-readable media containing code that, when executed by a processor, causes the machine to:
   detect layer 1 and 2 signals received at input hardware of a network device, the layer 1 and 2 signals associated with a call setup request originating from a point-of-presence, wherein the layer 1 and 2 signals comprise voltage levels and voltage fluctuations associated with a call setup request;
   identify a customer associated with the call setup request by identifying the point-of-presence, wherein the customer comprises a plurality of users;
   determine an appropriate resource server to authorize the call setup request based upon the customer associated with the call setup request, wherein the resource server is responsible for a service level agreement associated with the customer;
   associate the resource server with the call setup request; and
   transmit the call setup request to the appropriate resource server.

20. The article of claim 19, wherein the code further causes the machine to receive a response from the resource server indicating that the call is not within a service level agreement for the customer and to deny the call setup request.

21. The article of claim 19, wherein the code further causes the machine to receive a response from the resource server indicating that the call is within a service level agreement for the customer and to grant the call setup request.

* * * * *